US008792191B2

(12) United States Patent
Hopkins et al.

(10) Patent No.: US 8,792,191 B2
(45) Date of Patent: *Jul. 29, 2014

(54) KINEMATIC OPTIC MOUNT (71) Applicant: Utah State University Research Foundation, North Logan, UT (US)

(72) Inventors: Gregory Hopkins, Logan, UT (US); Blake Crowther, Preston, ID (US); Kendall Johnson, Richmond, UT (US); Vaughn A. Griffiths, North Logan, UT (US)

(73) Assignee: Utah State University Research Foundation, North Logan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,380

(22) Filed: May 10, 2013

(65) Prior Publication Data

US 2013/0242419 A1    Sep. 19, 2013

Related U.S. Application Data (63) Continuation of application No. 13/023,305, filed on Feb. 8, 2011, now Pat. No. 8,542,450.

(51) Int. Cl.
    *G02B 7/02* (2006.01)
(52) U.S. Cl.
    USPC .............. 359/819; 359/820; 359/822; 353/53
(58) Field of Classification Search
    USPC ................. 359/811, 813, 819, 820, 822–824; 248/485, 487, 558–560, 570, 614, 635, 248/693; 353/53, 72; 372/20; 29/428
    See application file for complete search history.

(56) References Cited

U.S. PATENT DOCUMENTS

| | | |
|---|---|---|
| 4,023,891 A | 5/1977 | Chadwick |
| 4,032,221 A | 6/1977 | Bibb et al. |
| 4,088,396 A | 5/1978 | Edelstein |
| 4,278,324 A | 7/1981 | Zipfel |
| 4,401,288 A | 8/1983 | Thompson |
| 4,708,420 A | 11/1987 | Liddiard |
| 4,752,111 A | 6/1988 | Fisher |
| 4,763,991 A | 8/1988 | Klotz, Jr. |
| 4,842,397 A | 6/1989 | Eisler |
| 4,846,545 A | 7/1989 | Estabrook et al. |
| 5,004,205 A | 4/1991 | Brown et al. |
| 5,204,712 A | 4/1993 | Bouwer et al. |
| 5,488,862 A | 2/1996 | Neukermans et al. |
| 5,661,591 A | 8/1997 | Lin et al. |
| 5,703,683 A | 12/1997 | Hunt et al. |
| 5,986,827 A | 11/1999 | Hale |
| 6,016,230 A | 1/2000 | Nunnally et al. |
| 6,198,580 B1 | 3/2001 | Dallakian |
| 6,201,650 B1 | 3/2001 | Jonas et al. |
| 6,229,657 B1 | 5/2001 | Holderer et al. |

(Continued)

*Primary Examiner* — Loha Ben (57) ABSTRACT

A two-axis, optical mount provides two flexural elements monolithically and homogeneously formed of a single material with, and interconnecting, three rigid segments. Between each pair of rigid segments, beginning with the first and second, a set of extensions is formed to have a cross section that permits simple, easy, independent adjustment therebetween. Likewise, a flexural element exists between the second and third rigid elements. Meanwhile, the rigid elements have section moduli sufficiently great as to be orders of magnitude larger than the flexural stiffness or section modulus of the flexural elements, thus providing flexures that operate in the elastic mode and introduce no joint type accuracy errors in adjustment.

20 Claims, 9 Drawing Sheets

(56) References Cited

U.S. PATENT DOCUMENTS

| | | |
|---|---|---|
| 6,388,789 B1 | 5/2002 | Bernstein et al. |
| 6,538,747 B1 | 3/2003 | Arnold |
| 6,556,729 B2 | 4/2003 | Satorius |
| 6,593,677 B2 | 7/2003 | Behin et al. |
| 6,614,601 B2 | 9/2003 | Dallakian |
| 6,636,679 B1 | 10/2003 | Mereness |
| 6,754,013 B2 | 6/2004 | Willis |
| 6,870,632 B2 | 3/2005 | Petasch et al. |
| 7,295,726 B1 | 11/2007 | Milanovic et al. |
| 7,346,093 B2 | 3/2008 | Sandstrom et al. |
| 7,495,849 B2 | 2/2009 | Heuser et al. |
| 7,538,959 B1 | 5/2009 | Wheeler |
| 7,609,467 B2 | 10/2009 | Blanding et al. |
| 7,653,094 B2 | 1/2010 | Sesko et al. |
| 7,800,852 B2 | 9/2010 | Blanding et al. |
| 7,916,408 B2 | 3/2011 | Blanding et al. |
| 8,085,482 B2 | 12/2011 | Frankovich et al. |
| 8,542,450 B2 * | 9/2013 | Hopkins et al. ............... 359/819 |
| 2011/0292527 A1 | 12/2011 | Frankovich et al. |

* cited by examiner

Section A-A

FIG. 13

Section B-B

FIG. 14

KINEMATIC OPTIC MOUNT

RELATED APPLICATIONS

This is a continuation application of U.S. Non-provisional application Ser. No. 13/023,305, filed Feb. 8, 2011, now U.S. Pat. No. 8,542,450.

TECHNICAL FIELD

This invention relates to adjustable mounting systems and, more particularly, to novel systems and methods for optical mounts for supporting optical elements such as mirrors, lenses, lasers, fibers, focal plane arrays, and the like.

BACKGROUND

In the assembling of optical systems, various components are typically assembled. Each component of an assembly must be positioned and aligned. Specific displacements and angles between optical elements along an optical path must typically be aligned as precisely as the requirements of the optical system. Various alignment mechanisms are used to assure alignment of the various components. Each component must be accurately positioned with respect to the intended propagation direction of electromagnetic radiation (e.g., light, at whatever frequency) is intended to travel.

The accuracy to which optical elements are initially positioned influences to a large extent the quality or precision of the system. Potential position errors may be induced in an assembly during assembly, alignment, adjustment, calibration, or operation of the components.

The alignment process itself is meticulous as each joint that is released in order to move a component may miss-align in more than the single degree of freedom desired to be adjusted. Thus, the alignment process is time consuming.

Because optical assemblies are assembled from several separate pieces, at each interface between components certain stresses will be induced by fastening mechanisms and processes. Those stresses may be created during assembly, during alignment, and during operation. For example, optical systems are often used in environments that undergo large temperature excursions. Specifically, cryogenic optics may operate at temperatures well below ambient, sometimes at only a few degrees Kelvin, from about 4 degrees Kelvin to 80 degrees Kelvin, or somewhat more.

Meanwhile, devices must be manufactured and set up by human beings at standard atmospheric temperatures and pressures. At every joint, thermal stresses and unpredictable stick, slip, or both may occur due to residual stresses from fastening, thermal expansion and contraction of components, or both. Changes in temperature during the life of an instrument often cause variations in net expansion or contraction of materials as a result of temperature variations, material property differences, and usually both. Accordingly, over time, and over temperature, various additional stresses may be induced, relieved, or both.

The net effect is changes in position over time caused by the components and the alignment mechanism. Accordingly, these influences all affect the accuracy with which an optic can be aligned so light rays will pass through the optical system as precisely as desired. Accordingly, the accuracy of the optical system is very dependent on the ability to align and maintain in alignment the components of the system.

What is needed is an optic mount that is more easily aligned and less influenced by the foregoing sources of error during alignment and over time.

SUMMARY

In view of the foregoing, in accordance with the invention as embodied and broadly described herein, a method and apparatus are disclosed in one embodiment of the present invention that alleviates the foregoing problems by providing an entire mount that is monolithically and homogeneously formed to have three effectively rigid segments joined by flexures operating about two axes that are both orthogonal and coplanar.

Not just flexures, but the rigid elements as well, form together a single monolith of homogeneous material in some embodiments. The rigid segments are effectively blocks connected in series by the flexures, formed of a single material. From a single block of that material, the mount is completely fabricated. No joints are used between the rigid elements and the flexures, nor between the constituents along the entire path from the first rigid element throughout the mount to the last rigid element.

On the first and last rigid elements may be certain operable fasteners. Accordingly, the fasteners may be connected to, through, or within the rigid elements. However, the section modulus of each rigid element is orders of magnitude greater than the operable (i.e., bending) section modulus of each flexure.

Accordingly, the section modulus of each rigid element is typically much larger than that of any securement hardware fixing the optical element that will be attached thereto. Differences in section modulus between the rigid and flexural elements may be multiple orders of magnitude. Thus, each of the rigid elements effectively serves as a rigid, non-bending element.

In reality, all structural elements deflect with respect to all loads. However, when the element to which a bending force is applied has such a large section modulus as to be so stiff that the forces lack the order of magnitude to make any appreciable deflection, we may assume that deflections are negligibly small, and may often be ignored. Alternatively, the small error may be calculated, or measured, and accommodated In one embodiment of an apparatus and method in accordance with the invention, a first rigid element or segment may be a base. The base is responsible to be secured to some mounting surface. For example, in a satellite, rocket, combat vehicle, aircraft, optical system bench, or other device carrying or acting as a platform for an optical system, the base may secure to that platform.

A flexure (or set of flexures), made of extensions of the material of the base, may extend out to provide flexural or pivoting, relative motion for a second or intermediate rigid element. This second rigid element or segment is formed of the same material, and is fabricated from the same block of material as the base. This flexure or set pivots the second rigid element with respect to the first rigid element.

In turn, the second rigid element extends to a third rigid element by way of a flexure (e.g., one or more flexures). This flexure defines another flexural axis about which the third element may pivot with respect to the second element.

All these components are actually one single, continuous piece of a homogeneous material. By homogeneous is meant a single material, such as steel or aluminum, formed at a single time.

Thus, in general, the second element is free to pivot along a first axis defined by a flexure or flexure set having comparatively small section moduli with respect to the first element, thus providing a solid but elastic pivot axis for the second element with respect to the first element.

In like manner, at an orthogonal direction with respect to the first flexural axis, a second flexural axis is formed in a similar manner. The second flexural axis is defined by a flexure or flexure set that are again manufactured from the same material as the second and third elements and extending between the second and third elements to define an axis, a second flexural axis positioned orthogonally and co-planar with respect to the first orthogonal axis.

In one presently contemplated embodiment, the first flexures between the first and second elements may extend from the first element toward the second element. Meanwhile, the second set of flexures defining the second flexural axis may extend from the second element back toward the third element. Thus, it is possible (and has been so constructed), to prepare a pair of flexural axes defined by two flexures that elastically deflect about two respective axes that are not only orthogonal but also coplanar.

In general, the first rigid segment may be referred to as the base, and connects to the platform carrying the optical system. The last rigid element, commonly the third rigid segment or element and so it will be called here, is the seat element or the mounting element to which the optical element is to be aligned and will be fixed. This optical element may be adjusted in alignment by tilting the third element about the second flexural axis defined by the second flexure. This results in movement with respect to the first and second elements.

Meanwhile, the third element may also be adjusted in a defined direction, orthogonal being one of the most preferential, by pivoting the second element about the first set of flexures with respect to the first rigid element. This moves the third element with respect to the first, but not the second element. In this way, two orthogonal, coplanar axes are the references about which the third element is aligned.

In one currently contemplated embodiment, a feature of the optical element may be positioned at a point within the plane defined by the two orthogonal flexure axes. Thus, for example, an optical element, such as a mirror, may be mounted to the seat element, the third rigid element, and positioned with a significant optical feature, such as a vertex, a focal point, a center of curvature, nodal point, or other feature placed within the plane of the two flexural axes.

Accordingly, alignment becomes greatly simplified, and the sources of error as well as the exaggerations or amplifications of errors may be reduced and in some cases substantially eliminated. For example, due to the monolithic construction of the mount, and the fact that it is made of a homogeneous material, the mount is comparatively insensitive to large temperature excursions.

The mount does not induce inadvertent and unpredictable slip-stick errors into the ray path of an optical system. The temperature is largely controllable and predictable across the mount surface and throughout the mount since the mount is formed of a single, monolithic, homogeneous material.

Coefficients of thermal expansion do not serve as sources of error because all of the segments and their flexures are formed of the same homogeneous material. Moreover, the monolithic nature provides a complete lack of interface thermal resistance that would exist typically across joints in any assembled system, with its variations in materials, and its lack of molecular continuity between materials across any joint.

Because the mount is a single component, there are no joints that can slip within the path from the first element to the third element. The only joints that can introduce slippage are those at the location where the base mounts to the platform, and in the third element where the optical element attaches to the seat or third rigid element.

However, since the section modulus of each of these two (first and third) rigid elements is orders of magnitude higher than that of the flexures across their bending axes and of the mounting hardware, the errors are tractable, measurable, and largely correctable. However, most significantly, those errors may be isolated to their respective mounting fasteners and do not affect and do not introduce any unpredictable and uncontrollable errors along the path from the first rigid element to the third rigid element.

Because the mount is formed of a single homogeneous material, that material may be selected to match the material expansion characteristics or the coefficient of thermal expansion of the optical element. Thus, without intermediate componentry, the mount significantly reduces the potential of stick-slip at joint surfaces. Stick-slip is a phenomenon of materials in frictional contact that may have unpredictable residual stresses or thermal stresses causing them to slip at times and stick at times, both of which are largely uncontrollable except when the fastening force is removed. Thermal excursions tend to act on such joints to cause periodic sticking, slipping, stress inducement, and stress relief at uncontrollable times and in indeterminate amounts.

Accordingly, an optic mount in accordance with the invention may significantly improve alignment of optics, in both absolute alignment, alignment stability, as well as simplifying the process for effecting alignment. In transition between the assembly temperature and the operational temperature, the residual stresses are likewise alleviated, by not being introduced, because of the monolithic, homogeneous formation of the mount. A mount in accordance with the invention is thus as slip free as physically possible.

Flexures deflect and deform within the elastic region of the material of which the mount is made. Typically, the mount is made of a metal, and flexures may be formed to be of a suitable dimension such that they operate at all times within the elastic region of the metal in which they are formed. Thus, no mismatched thermal stress is induced nor relieved over time. Also, particularly, no stress is induced as a function of changes in temperature of joints throughout the system because there are none from rigid element one through rigid element three.

With no joints, the mount itself contains no component joints that may cause any related unpredictable thermal contact, any stick-slip activity, any residual stresses, any random stress relief, or the like that may cause the mount to move out of alignment.

Each of the flexures defines an axis and each flexure or flexure set may be machined in a single operation. All flexures and rigid elements may be formed in a single setup. Thus, the error is absent that is typically introduced every time a component is removed from, or re-oriented in, a manufacturing mount or jig such as a chuck, table, vise, or the like and then remounted. Certain operator and machine errors may be introduced in such circumstances.

Accordingly, potential deviations in the displacement or angle of the flexure from the axis it originally defines may be substantially eliminated. Flexures therefore are cut co-aligned. Co-alignment of flexure sets is assured.

A set of flexures may be any number of flexures aligned, sharing a single pivot axis, and typically machined electro-dynamically, simultaneously, in a single operation.

Thus there is not the conventional, unpredictable, movement by stress inducement, stress relief, stick-slip action between frictionally secured adjacent components, or the like caused by component joints with their disparate material expansion and contraction with temperature, galling, and so forth with coincident unpredictability causing portions of a mount to move out of alignment. Further, stresses from flexure segments not being co-aligned are avoided which could result in the flexures deforming beyond their elastic region. Likewise, with no multiple setups for machining a flexure set, the potentially, ever present errors of trying to co-align components having joints therebetween may be eliminated. Moreover, the setup errors caused by removing or re-orienting, a workpiece from a chuck or table of a manufacturing machine, and then re-aligning it and re-registering it, always induces operator, machine, or other errors. These errors will always be present and undetectable at increments lower than the smallest measurable increment of the system. By having a single setup for manufacturing a flexure set, these cumulative setup errors will be eliminated.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1-4, while referring generally to FIGS. 1-14, a mount in accordance with the invention may include a base 12 that is formed as a comparatively rigid segment. By rigid is meant that the base 12 has a section modulus in each dimension that is substantially greater than the minimum section modulus of the elements that will be responsible to flex.

Meanwhile, the base 12, as the first rigid element 12 of the apparatus 10 or mount 10, is responsible to be mounted to a platform. Typical platforms may include an aircraft, a satellite, a ground-based sensor platform, optical system bench, or the like. Thus, in general, the first rigid element 12 or base 12 has a comparatively large section modulus in all three of its principle dimensions. It is configured to be mounted to some other platform responsible for carrying the optical instrument whose alignment is the functional purpose of the mount 10.

A frame 14, a second rigid element 14, likewise has a comparatively very large section modulus. Typically, the section modulus of the frame 14 may be of the same order of magnitude as that of the base 12. Generally, a section modulus reflects the amount of material in a cross section and its distance spaced away from the neutral axis or central neutral axis in a bending mode. Thus, the section modulus is a direct material property and section property controlling the stiffness, rigidity, and strength of a member.

For example, in a rectangular cross section, where a neutral axis passes through the center of that rectangular cross section, the measurement of the rectangular cross section along that axis is characterized by the letter "b," while the distance of the farthest edge of the rectangle spaced away from that axis is a distance "d." Thus, the section modulus of such a cross section is the value of the base measurement multiplied by the cube of the distance measurement, all divided by twelve. The integration mathematically is responsible for the particular form and the value of the constant twelve. Other cross sections will be different. Nevertheless, this is illustrative.

The section modulus of a structural member is proportional to the third power of the distance away from the neutral axis of the outermost fiber supporting tension or compression in the member during bending. Thus, in an apparatus and method in accordance with the invention, the section modulus of the base 12 is orders of magnitude larger than the section moduli of flexural members about their bending axes that will exist between such rigid elements 12.

The frame 14 likewise is comparatively rigid in that its section modulus is orders of magnitude larger than that of flexural elements in bending. Finally, a seat 16 constitutes a third rigid element 16. This has a section modulus similar to those of the base 12 and frame 14. In each case, the base 12, the frame 14, and the seat 16, sometimes referred to as the first, second, and third rigid elements 12, 14, 16 or as rigid segments 12, 14, 16 a section modulus in each of the three orthogonal directions need not be identical to that in other directions. That is, each of the elements 12, 14, 16 is not a cube. Nevertheless, the section modulus in each direction is sufficiently high and all section moduli are sufficiently comparative with one another, so as to constitute rigid elements 12, 14, 16 with respect to the flexures 18, 20.

The flexures 18, 20 are formed in pairs. For example, the flexures 18a, 18b are formed between the first 12 and second 14 rigid elements, the base 12 and the frame 14.

A set 18 of flexures 18a, 18b, may actually be comprised of any number of axially aligned flexures 18a, 18b, formed simultaneously in a single EDM machining operation, and thus pivoting (bending) about the same axis 19.

Also, the dimensions of flexures 18a, 18b, 20a, 20b may be selected to control distances, section modulus, strength, stress, and the like. For example, the minimum thickness dimension of each flexure 18a, 18b, 20a, 20b across the respective flexural axis 19, 21, as well as the flexure width dimension (measured along such axis 19, 21), may be selected to maximize, minimize or otherwise optimize mechanical properties or performance. The flexure length dimension (respective distance extending between two rigid elements 12-14 or 14-16 joined by the flexure set 18, 20) may be selected on a similar basis.

The flexures 20a, 20b are formed as a pair extending between the second 14 and third 16 rigid elements, namely the frame 14, and the seat 16. In general, each of the sets 18, 20 of flexures 18, 20 is a matched pair formed to bend along a single, shared, axis of pivot. Each of the flexures 18a, 18b thus has a central, narrowest cross section centered along the flexural axis, which may also be referred to as the flexure 18, or the flexural axis 19, because it passes through the flexures 18a, 18b.

In similar fashion, the flexures 20a, 20b are formed together each from the same monolithic piece of material from which the entire mount 10 is cut, to have a shared axis 21 of pivot. Thus, the flexures 18a, 18b pivot around their axis 19, while the flexures 20a, 20b pivot together or bend together along their axis 21. In this way, the flexures 18, 20 have a sufficiently strong material of which they're formed at a sufficiently thin overall thickness (compare the distance "d" in the section modulus equation) such that the outermost fiber of neither the flexures 18 nor the flexures 20 is ever permitted to reach the yield value of stress. Accordingly, each of the flexures 18, 20 operates entirely in the elastic range of stress and strain.

In one embodiment of an apparatus and method in accordance with the invention, the mount 10 is formed of one single, monolithic, not only integral but homogeneous, piece of material. Typically, that material will be a metal. Aluminum, steels, and other more exotic metals may serve in this function.

As a manufacturing matter, one method by which the mounts 10 may be manufactured is electrodynamic machining. This method is well documented elsewhere in the technical literature. It involves a probe electrically charged to have a potential between the mount in which a workpiece is held, and the EDM wire (probe) that machines the work piece as known in the art. By putting sufficient electrical potential between the mount (therefore the workpiece), and the probe, atoms of metal may be precisely removed from a workpiece in order to cut particular shapes. Often, such machining is done in a submerged dielectric oil bath in order to provide cooling, transport of the machined material, and so forth.

In manufacturing the mount 10, each of the flexure sets 18, 20 is machined from the same material as the base 12, frame 14, and seat 16. Thus, the entire assembly may be manufactured as a single mount 10, on a machine designed for the manufacture. Therefore one need not account for nor impose the additional human operator or machine errors that might otherwise occur if a piece must be removed from the work holder, later replaced, and re-registered for machining a flexure set. Thus, only the hysteresis of the machine itself can contribute to errors in the position of machined features while fabricating the mount 10. This eliminates numerous sources of error, including, particularly, joint error, joint creep, "crawling" of portions of a joint due to stick-slip during large temperature excursions, or the miss-alignment of flexure sets.

This monolithic and homogeneous construction of the entire mount 10 also provides elimination of "discontinuity" thermal barriers. These are presented by joint discontinuities, faces of materials in contact. The mount 10 is made as one, single, continuous, contiguous piece of a single homogeneous material. Thus no joint discontinuity exists in the heat flow path in the mount 10.

Continuing to refer to FIGS. 1-4, while also referring generally to FIGS. 1-14, the flexures 18, 20 define bending axes 19, 21 extending therebetween and passing through the central and narrowest dimensions thereof. The comparatively small bending loads do not rise to the stress levels required to yield the material from which the mount 10 is made.

Nevertheless, each of the flexures 18, 20 has dimensions orthogonal to its respective axis 19, 21. Each extends the minimum thickness in one direction and the maximum extent into the adjoining rigid elements 12, 14, 16, respectively, continuously. The flexures 18, have their maximum stress and maximum deflection both minimized in bending when displacing either the frame 14 with respect to the base 12, or the seat 16 with respect to the frame 14. The section modulus in the plane orthogonal to the direction of bending about the axes 19, 21 about which each of the flexures 18, 20 do indeed bend or deflect, is or remains comparatively stiff.

In some embodiments, the dimensions orthogonal to the axis of bending in each case will be or may be of an order of magnitude equivalent to at least one dimension of each of the base 12, frame 14, or seat 16. Thus, a comparatively stiff and stable mounting device is formed by each of the flexures 18, 20. Nevertheless, in the single degree of freedom afforded each, the maximum stress and the permissible loading that each may exert on one of the rigid elements 12, 14, 16 is substantially limited about that axis of flexure 19, 21.

In certain embodiments, the seat 16 may have a surface 22 establishing a datum for mounting an optical element 40. Typically, the surface 22 may be recessed behind a shoulder 24, or leave a shoulder 24 between the front face 26 of the seat element 16, and the surface 22 to which hardware may be registered, mounted, or both.

As a practical matter, the surface 22 need not be flat nor of any shape other than that required to perform the mounting function. For example, the surface 22 may include bosses, variations in surface setback from the face 26, and may include pylons, mounting holes, or the like. In the illustrated embodiment, it may provide substantial thermal conduction benefits, as well as mechanical stability benefits to maintain cross sections of the base 12, frame 14, and seat 16 as large as stiffness requirements demand.

For example, the section modulus governs the stiffness in flexion along any dimension of a structure. Accordingly, the section modulus is increased by increasing the amount of material and the distance thereof from the neutral axis about which bending occurs. It may be desirable in many instances to maintain the stiffness of any of the rigid members 12, 14, 16 at a maximum level in most embodiments. This assures that they are incapable of introducing significant errors due to their own distortion or internal deflections.

Likewise, because the flexures 18, 20 typically have a minimum dimension that may be about an order of magnitude less than the minimum dimension of any of the rigid members 12, 14, 16, the section modulus of each of the rigid members 12, 14, 16 may typically be three orders of magnitude or about a thousand times the section modulus of the flexures 18, 20. Moreover, because the flexures 18, 20 are shorter in their overall width along the direction of the bending axes thereof, the flexures 18 will also have a lower "b" value or base value along that axis, and therefore have a linearly reduced section modulus as compared to the moduli of the rigid members 12, 14, 16.

In the illustrated embodiment, an opening 28 is formed in the body of the frame 14. Accordingly, the frame 14 effectively frames or surrounds the imaging area that is passing light or other electromagnetic radiation toward the surface 22 of the seat 16. Accordingly, in order for an optical element 40 to be exposed to the incoming radiation, an opening 28 provides a view through the frame 14.

As a practical matter, in order to make a mount 10 in which each of the flexures 18, 20 bends along a respective axis 19, 21 in a single plane, the base 12 and seat 16 are positioned on the same side of the frame 14. Thus, for example, the base 12 is connected by the flexures 18 to the frame 14. Meanwhile, in order to place the flexures 20 in a position to have a bending axis 21 coplanar with the axis 19 of the flexures 18, the seat 16 is spaced away from the frame 14 in the same direction as the base 12 is distanced or spaced from the frame 14.

Thus, one may think of the base 12 mounted to a platform having extensions 18 or flexures 18 that extend forward toward a frame 14, and the frame 14, in turn, having its own flexures 20 extending to the seat 16, extending backward of the frame 14, and toward the base 12 in order to place the axes 19, 21 of flexures 18, 20 in a single plane.

The face 30 of the frame 14, may be tilted about the flexures 18 (axis 19) with respect to the base 12. Meanwhile, operating in a direction orthogonal to the axis 19 of the bending of the flexures 18, the seat 16 may be tilted about the flexures 20 on an axis 21 that is both orthogonal to and coplanar with the axis 19 of the flexures 18.

In general, the walls 32 and floor 34 of the base 12 may be formed in any suitable configuration. For example, the clearances between the walls 32 rendering visible the seat 16 in FIGS. 1-4 are much more occupied in the remaining FIGS. 5-14.

Referring to FIGS. 5-14, specifically, while continuing to refer generally to FIGS. 1-14, the base 12 may actually be constructed of materials extending around and into portions of the frame 14 or second rigid element 14. For example, in order to provide adjustments, orientations, mounting fixtures of apertures, and the like, the walls 32 and floor 34 may simply be represented by contiguous and continuous material formed to have some amount of clearance 36 from the seat 16.

Referring to FIGS. 1-14, the clearances 36 are formed to provide spacing of portions of the base 12 from itself, and portions of the base 12 from the seat 16. Similarly, other clearances 38 may be formed to provide clearance between the base 12 and the frame 14, as well as clearances 39 between the frame 14 and the seat 16.

For example, in certain applications, the motion of the seat 16 with respect to the frame 14 may be comparatively small with respect to the dimensions of the seat 16. Similarly, the movements or deflections of the frame 14 with respect to the base 12 may be comparatively small with respect to any of the dimensions of the frame 14 or the base 12. Nevertheless, some amount of clearance 36, 38 is required in order for each respective one of the rigid elements 14 and 16 to move with respect to each other and with respect to base 12.

Other contacts may be made, or connections, between the base 12, frame 14, and seat 16. For example, once an optical element 40 is mounted to the surface 22 of the seat 16, that optical element needs to be aligned. The orthogonality of the axes 19, 21 about which the flexures 18, 20 deflect or bend is extremely helpful. By providing the axes 19, 21 of the flexures 18, 20 at orthogonal directions to one another, and co-planar, an adjustment 42 or adjuster 42 acting between the base 12 and the frame 14 may independently adjust position in a single degree of freedom by applying a force to one side or the other of the frame 14 about the flexure 18 with respect to the base 12.

Similarly, between the seat 16 and the frame 14 another adjuster 44 or pair of actuators 44 operating as an adjuster 44 may tilt the seat 16 with respect to the frame, about the flexures 20. Because the axes 19, 21 of the flexures 18, 20 are orthogonal to one another, and co-planar, the adjusters 42, 44 operate completely independently from one another in space and in time of adjustment. Thus, an adjustment made by the adjuster 42 altering the angle between the base 12 and the frame 14, has substantially no significant effect on the adjustments made by the adjuster 44 in the orthogonal angle being controlled between the seat 16 and the frame 14 across the flexures 20.

The adjusters 42, 44 may be developed and implemented in any suitable form. For example, a system of screws, receiving nuts, lock nuts, and the like may be used to apply positioning force acting at one position of the respective adjuster 42, 44 connected to one of the rigid elements 12, 14, 16 and another end of the adjuster 42, 44 being positioned to contact and thus apply force to the opposite element 14, 16, 12. Thus, each respective adjuster 42 is effective to apply a displacement between only two of the rigid elements 12, 14, 16.

The adjuster 42 is responsible to adjust the frame 14 with respect to the base 12. The base 12, in turn, is rigidly fixed to a platform as discussed hereinabove.

Meanwhile, the adjuster 44 is solely responsible to adjust the seat 16 with respect to the frame 14. Moreover, however, each of the adjusters 42, 44 is responsible only to adjust the seat 16 with respect to the base 12 about a single axis, and those two axes are orthogonal to one another. Thus, in the embodiment of FIGS. 1-4, and likewise in the embodiment of FIGS. 5-14, actuation by the adjuster 42 to displace the frame 14 with respect to the base 12 will only be effective to alter the displacement of the frame 14, and the seat 16 connected thereto about the axis 19 defined by the flexures 18. This axis 19 in the illustrated embodiments is a "horizontal" axis in the orientation of the figures as shown.

Likewise, actuation of the adjuster 44 to provide displacement of the seat 16 with respect to the frame 14, effects the movement of the seat 16 with respect to the base 12 as well. However, the actual relative motion is all taken up between the frame 14 and the seat 16 about the axis 21 defined by the flexures 20.

This orthogonality provides for completely independent adjustment. At the crossing of the axes defining the flexures 18, 20 or the axes 19, 21 defined by the flexures 18, 20, the possibility of a slight deflection of that axis or center point of coincidence of the axes may occur. However, because of the orthogonality a co-planarity of the arrangement of the axes 19, 21 and their respective flexures 18, 20, no gain, no unpredictability, and no sliding or other translational displacements are permitted. Rather, each of the rigid elements 14, 16 may pivot with respect to one of the others, in order to effect two dimensional pivoting of the seat 16 with respect to the base 12.

A great benefit among the many benefits available from a mount 10 in accordance with the invention is the ability to now locate a specific feature of an optical element 40 with respect to the plane defined by the flexural axes 19, 21. For example, in certain embodiments, the optical element 40 may have a specific feature desired to be placed within the plane established by the axes 19, 21, and even at the intersection thereof.

For example, a vertex of the optical surface that performs the principle function of the optical element 40, may be placed in the plane of the axes 19, 21, or at the intersection of those axes 19, 21. Similarly, a center of curvature, a focal point, or nodal points of such an optical element 40 (e.g., mirror, array, etc.) may be placed within the plane established by the axes 19, 21 or even at the intersection thereof. Adjustment will not cause the beam to walk as it would in other arrangements where all pivoting is not about a single point. Some systems even rely on translation, greatly adding complexity to the alignment.

In accordance with the invention, it may be seen that the mount 10 is truly monolithic, notwithstanding the various changes in cross sectional area. Each of the rigid pieces 12, 14, 16, referred to respectively as the base 12, the frame 14, and the seat 16 represents a portion of the mount 10 having a comparatively large section modulus in all dimensions. Meanwhile, each of the flexures 18, 20 is formed as part of a pair, each being contiguous and continuous extensions of the very same material as the rigid elements 12, 14, 16 between which each extends.

As a result of this contiguous and continuous homogeneous connection, the thermal continuity from the seat through the frame to the base is assured. Only the fastening mechanisms that secure the optical element 40 to the seat 16 may be discontinuous and thereby create a discontinuity in the thermal conductivity. However, this greatly minimizes the number of such joint-related resistances that will exist between any platform, and the optical element 40 carried by the mount 10.

Likewise, because each of the rigid elements 12, 14, 16 has a comparatively high sectional modulus, literally orders of magnitude larger than the section modulus of the corresponding flexures 18, 20 in bending, the relative rigidity is likewise orders of magnitude larger. This justifies a description of the rigid elements 12, 14, 16 as such, and in contrast to the relatively easily deflected flexures 18, 20.

As described hereinabove the coplanar orientation of the mutually orthogonal axes 19, 21 of the flexures 18, 20, respectively, provides for complete angular independence of adjustments. Mathematically, and from an engineering dynamics point of view, forces or displacements about axes orthogonal to one another cannot have any substantial influence on each other.

For example, pivoting a particular element about one axis 19, 21 that is orthogonal to another axis 21, 19 does nothing to influence the positioning about that second axis 21, 19. Accordingly, pivoting the seat 16 about the axis 19 of the flexure 18 moves the seat 16 only with respect to the base 12, and only with respect to movement about that axis 19.

Because the seat 16 pivots about an axis 21 with respect to the frame 14, and the frame 14 is fixed with respect to the base 12, the seat 16 has been moved only by pivoting with respect to the base 12 about that one axis 21. However, no influence has been made on the positioning of the frame 14 with respect to the base 12 by such a movement of the seat 16, nor orthogonally about the other axis 19. Pivoting the frame 14 about the axis 19 defined by the flexures 18 likewise has no effect on the accuracy or positioning of the seat 16 with respect to the frame 14. The motion of the frame 14 with respect to the base 12 about the axis 19 cannot influence the seat 16 and its relative position or tilt with respect to the frame 14 about the flexure 20.

A major benefit to the existence of the coplanar axes 19, 21 is the ability to use a single setup and manufacture of the mount 10. The manufacturing process may involve mounting a single, monolithic, homogeneous piece of material, typically a metal. The mount 10 may thus be mounted as a single block of material. The portions thereof will eventually become the base 12, the frame 14, and the seat 16. As a monolith all are likewise fixed in the mount.

Residual stresses should not remain in the mount 10 nor in any of the eventual subsystems 12, 14, 16. Likewise, the flexures 18, 20 should be free of residual stresses because none of them has been moved from its original position with respect to the original block or blank of material. The block of material from which the mount 10 is cut is then machined, typically by electrodynamic machining in order to remove the atoms of material in very small quantities, thus leaving no residual stresses.

In certain embodiments, the block or blank of material from which the mount 10 is made may be selected to be a stress-relieved, annealed material. A probe of an EDM manufacturing system may cut each of the clearances 36, 38, or other openings and access spaces. Thereby no additional machine or operator errors need be introduced into the measurement system during manufacturing.

In certain contemplated embodiments, the rate of cooling at which a particular optical element 40 may be drawn down into an operating temperature range may be improved due to the continuous and contiguous path for heat through the seat 16, the connecting flexures 20, the frame 14, its connecting flexures 18, and the base 12. Joints may exist between a platform and the base 12. Similarly, there may be fasteners or connections, joints of some suitable type between the seat 16 and the optical element 40. However, from the optical element 40 to the base 12, the only joint that represents a discontinuity of materials or a change in materials, is between the seat 16 and the optical element 40. Moreover, the optical element 40 may be largely comprised of the same material as the mount 10. Accordingly, only the joint itself, and not material changes will be in effect. The coefficients of thermal expansion according to which the mount 10 and the optical element 40 may shrink or enlarge with temperature may be identical.

One of the difficulties with wide ranging thermal excursions in a device involves the possibility of slip-stick actuation or activity between two materials joined at a discontinuity. That is, a joint wherein two materials or where two components meet is subject to a certain amount of slippage. Nevertheless, with the force of mounting hardware or fasteners of some type, a frictional force is set up along the joint surface.

Galling may occur at contracting surfaces. As materials shrink and swell with temperature, the dissimilarities of coefficients of thermal expansion may cause unpredictable and uncontrolled sticking and slipping between material on opposite sides of a joint interface. These types of residual stresses are largely indeterminate and uncontrolled, but are substantially absent throughout the mount 10 in accordance with the invention.

Thus, compared to other systems, there are no joints between the adjustment axes. The mount system 10 is easier to maintain thermally stable and dimensionally stable. Moreover, each of the rigid segments 12, 14, 16 or elements 12, 14, 16 is fully independently adjustable in its degree of freedom.

Because the control of the rate of cooling is enhanced by the continuous thermal conductivity in a single, contiguous material, residual stresses may effectively be greatly reduced or eliminated. Typically, when materials have different coefficients of thermal expansion, they will increase or decrease in size according thereto. Typically, switches and other actuators that are temperature sensitive are often fabricated as bi-metallic strips. Accordingly, when one side of the strip has a different coefficient of thermal expansion then the opposite side, then a change in temperature will force the strip to form an arc, bending around the smaller radius of the material that shows the least expansion, or the most contraction, depending on whether the temperature is being raised or reduced. Thus, the lack of joints, not only relieves residual stresses, the possibility of stress inducement and relief with the crawling of components about a joint interface, and the like, but no thermal expansion difference is experienced between any of the components 12, 14, 16, 18, 20 of the mount 10.

Thus, a new means and method for alignment is introduced by the mount 10. Typically, because both of the axes 19, 21 are in a single plane, the optics 40 or the optical element 40 may be positioned to have any desired feature thereof placed precisely with respect to the plane of the axes 19, 21 and even at the intersection of the axes 19, 21. This is possible whether the feature is a focal point, a vertex, center of curvature, nodal point, or any other point related to the face of a mirror, lens, or the like to be positioned. Any one of these may be positioned precisely with respect to the intersection of the axes 19, 21, placed in the plane formed by the axes 19, 21, or placed exactly at the intersection of the orthogonal axes 19, 21.

Another valuable benefit, among the many available with the mount 10, is the ability to arbitrarily select the means and design to align positions of the seat 16 with respect to the frame 14, and the frame 14 with respect to the base 12. Thus, the degree of precision, the cost, the operating mechanism, the calibration and measurement mechanism, or the like may be selected at will according to space, precision, cost, and so forth.

Moreover, the mechanisms to tilt the seat 16 about the flexures 20 with respect to the frame 14, or the frame 14 about the flexures 18 with respect to the base 12 may also be different mechanisms. Moreover, neither affects the operation of the other. Thus, the errors or accuracy desirable or tolerable with respect to either of the axes 19, 21 may be isolated and not dependent on each other.

Figure 6:
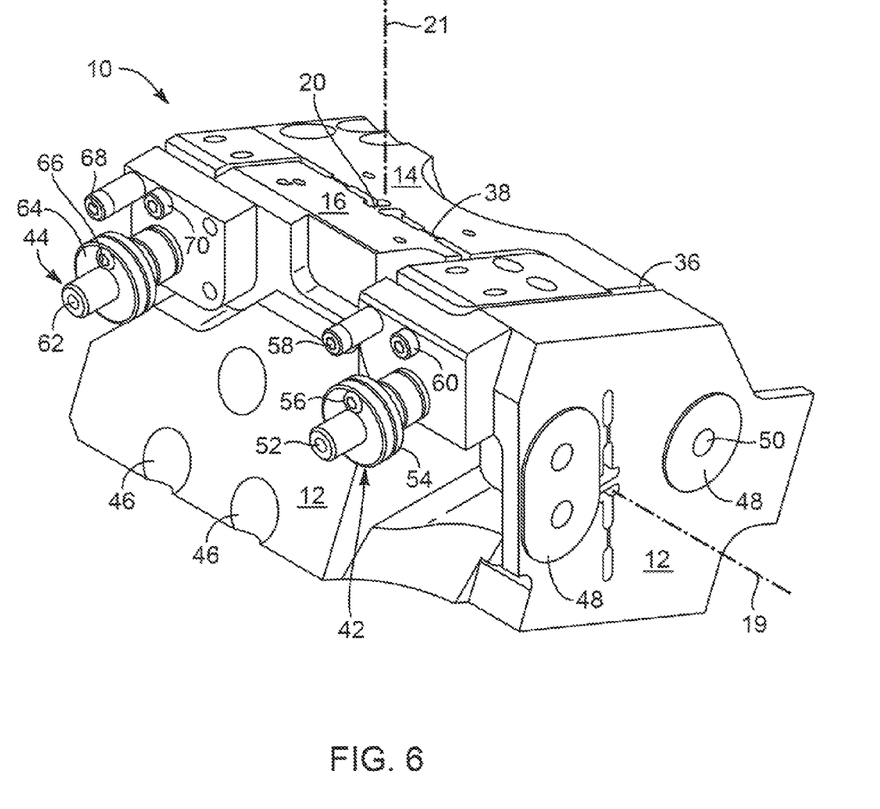
FIG. 6 is a rear perspective view thereof.
Figure 7:
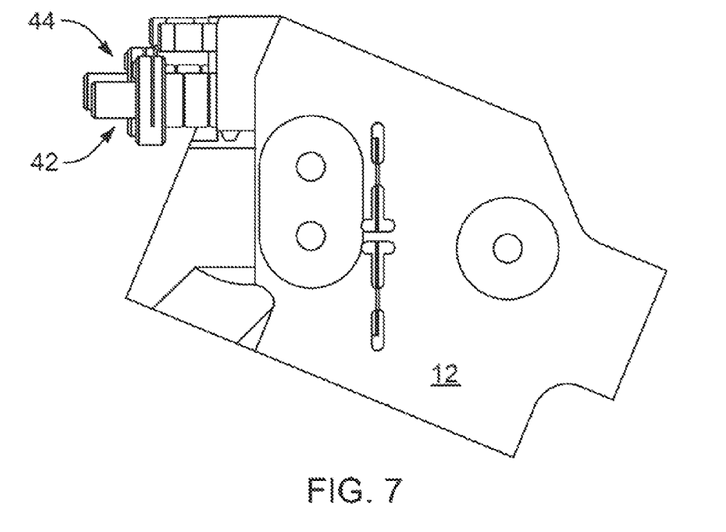
FIG. 7 is a left side elevation view thereof.
Figure 8:
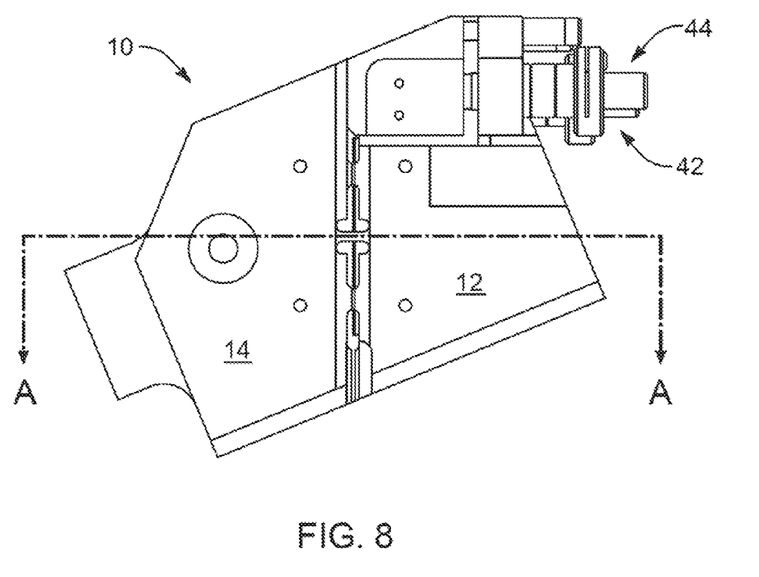
FIG. 8 is a right side elevation view thereof.
Figure 9:
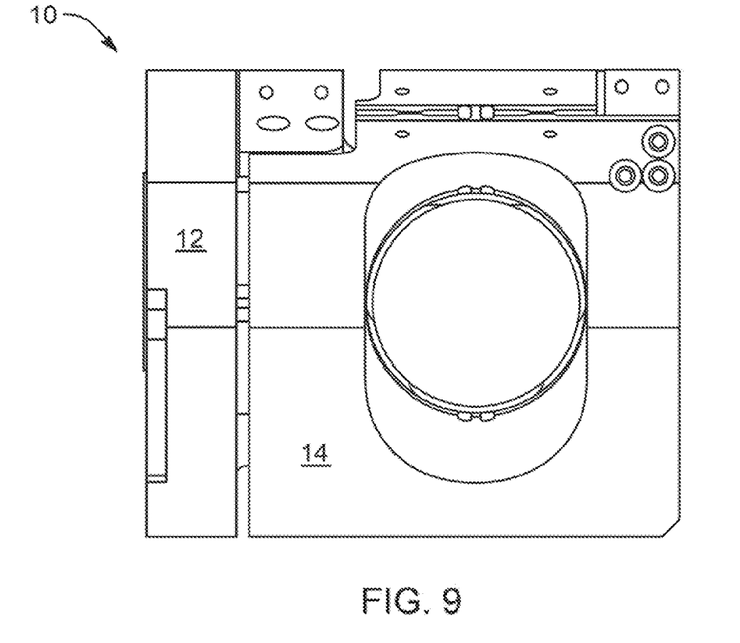
FIG. 9 is a front elevation view of the apparatus of FIGS. 5-8.
Figure 10:
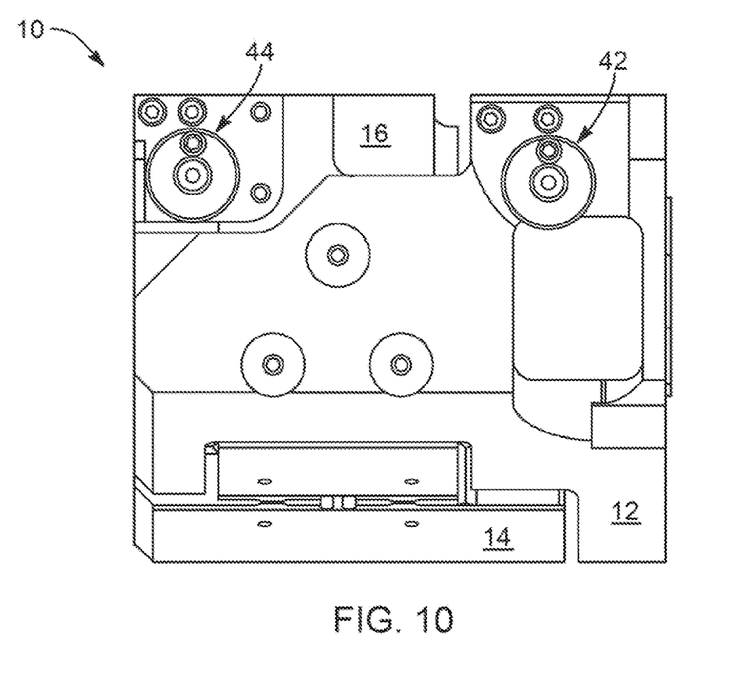
FIG. 10 is a rear elevation view thereof.
Figure 11:
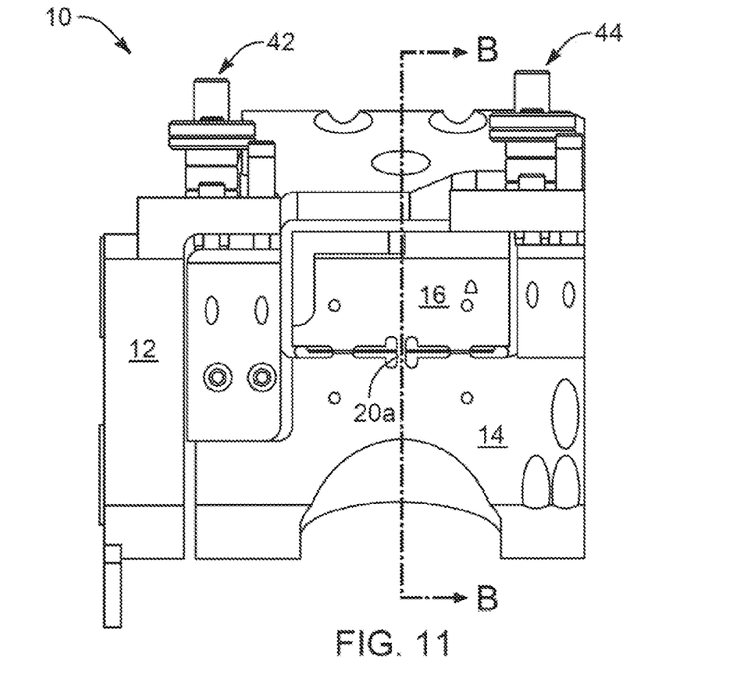
FIG. 11 is a top plan view thereof.
Figure 12:
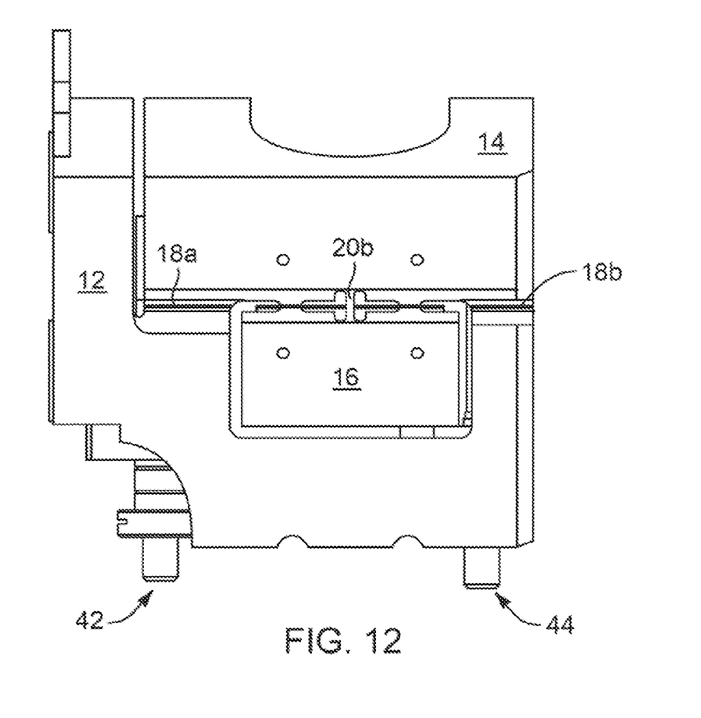
FIG. 12 is a bottom plan view thereof.
Figure 13:
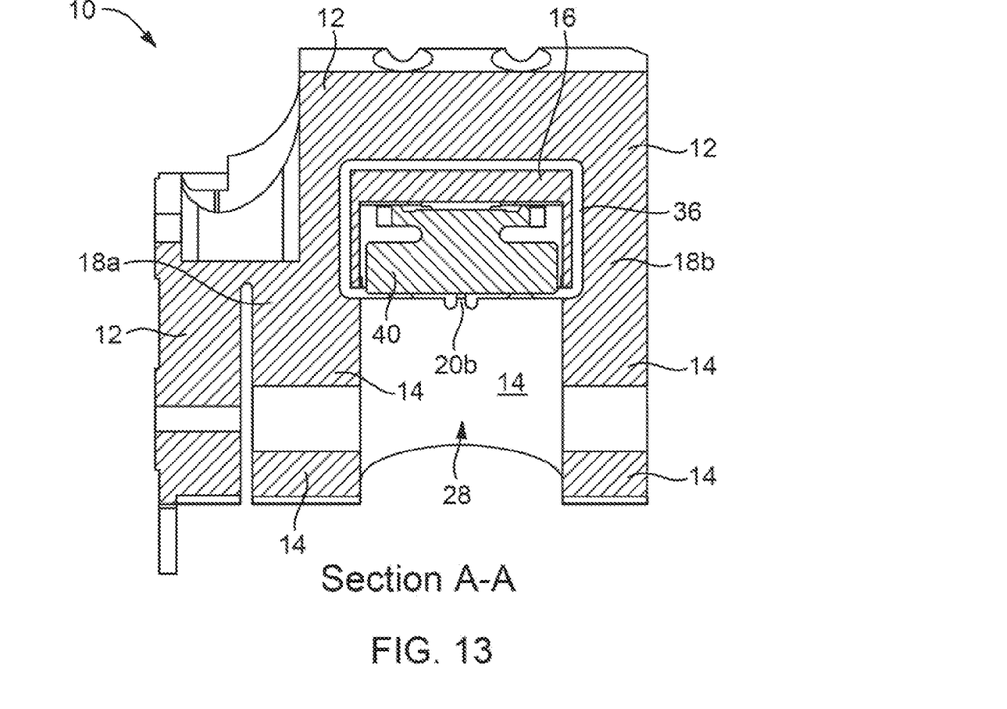
FIG. 13 is a top plan view of the cross section A-A from FIG. 8.
Figure 14:
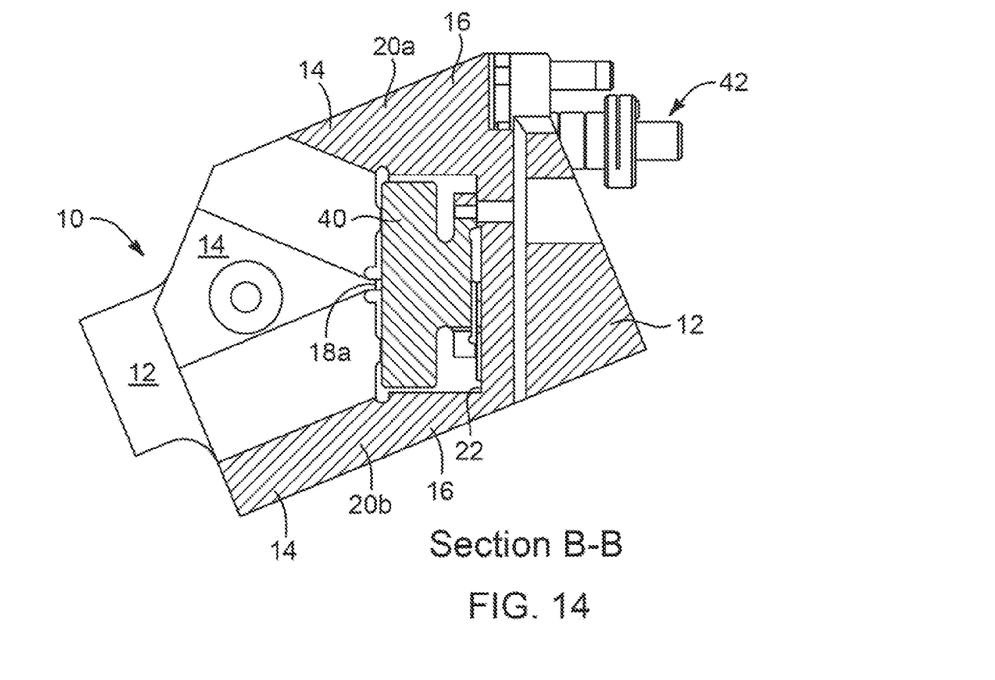
FIG. 14 is a side elevation cross sectional view of section B-B from FIG. 11.

Referring to FIG. 6, while continuing to refer generally to FIGS. 1-14, in certain embodiments of an apparatus 10 and method in accordance with the invention, the mount 10 may include various holes or openings 46 designed to provide access for mounting to a platform, or providing access to other fasteners and the like. Typically, various bosses 48 may be formed on various surfaces of the base 12 and other components 14, 16 as appropriate for providing mounting surfaces. By creating a boss 48 elevated above the level of its adjoining surface of the mount 10, the extra material available may be machined and lapped to a very fine precision as desired. Meanwhile, the surface of the boss 48 will fit against a mating surface to which the mount 10 may be fastened through holes or openings 50.

In one embodiment of an apparatus 10 as illustrated, the adjuster 42, may have a finely threaded screw 52 for making adjustments. In one embodiment, the screw 52 may have a very fine thread, and pass through a nut 54. The entire structure that includes the flange and the associated cylindrical components may form a nut 54 though which the screw 52 may be threaded. In some embodiments, the threads may actually be pitched at over one hundred threads per inch. Meanwhile, the nut 54, which effectively serves as a mount 54 receiving the screw 52, may include a flange portion having a large diameter, and the flange may be split as shown. Accordingly, a lock screw 56 may distort the flange portion of the nut 54, thus binding it against the screw 52 in order to stop or lock the screw 52 at a specific position.

The nut 54 is mounted to the base 12. The screw 52 is secured thereto, and has a hardened steel ball fixed at the advancing end thereof. The advancing ball minimizes distortion as it touches against the frame 14 in order to adjust (e.g., tilt) the frame 14 with respect to the base 12.

The apparatus 10 may also include a guide rod 58, which may also be mounted in a nut fixed to the base 12. The guide rod 58 contains a biasing spring, not visible in the illustration, applying a biasing force opposite to the force of the screw 52, and against an opposite side of the frame 14. Accordingly, the screw 52 may be advanced to tilt the frame 14 in one direction about its flexures 18, while a retreat of the screw 52 will permit the biasing spring on the guide rod 58 to advance the opposing side of the frame 14, thus providing stability and a full range of motion. A lock 60 locks the adjuster 42 in position.

In like fashion, the seat 16 or third rigid element 16 of the mount 10 may have secured to it an adjuster 44. The adjuster 44 includes a screw 62 that operates similarly to that of the mechanism of the screw 52, operating in a flanged nut 64 secured to the seat 16. Just as the screw 52 pushes from the base 12 against the frame 14, the screw 62 pushes from the seat 16 to the frame 14. Accordingly, the screw 62 tilts the seat 16 about its flexures 20 oriented orthogonally with respect to the flexures 18.

Similarly to the operation of the adjuster 42, the adjuster 44 may include a lock screw 66 that binds together the two circular halves of the flange portion of the flange nut 64. Accordingly, the lock screw 66 supports locking or binding of the flanged nut 64 against the screw 62, fixing the screw 62 in place at its adjusted position.

The guide rod 68 extends against an opposite location in order to guide a biasing spring pushing the seat 16 away from the frame 14, just as the spring on the guide rod 58 urges separation of the frame 14 from the base 12. A lock 70 locks the system in position, acting similarly to the lock 60 of the adjuster 42.

Typically, each of the screws 52, 62, 56, 66, 58, 68 may be mounted in a collar or nut that effectively serves as its mount with respect to the mount system 10. Accordingly, each of these nut or mount elements that receives a threaded screw, whether the screw is acting as an adjustment screw 52, 62 or as a guide rod 58, 68, or as a lock screw 56, 66, 60, 70, having dissimilar metals for metal-to-metal contact alleviates galling. Typical materials may include stainless steel for the moveable elements (the screws 52, 56, 58, 60, 62, 66, 68, 70), while the collars (e.g., nuts) are typically formed of bronze.

The screws 60, 70 tend to be best adapted to operating against the screws 52, 62, respectively. Accordingly, once adjustments are finalized the screws 60, 70 may be advanced to provide a force to replace the bias springs on the guide rods 58, 68. This provides a stable, minimally-vibration-sensitive system 10.

Nevertheless, various mechanisms may be used for adjusting the seat 16 with respect to the frame 14, and the frame 14 with respect to the base 12. Ultimately, the relative position of the frame 14 with respect to the base 12 is orienting the seat 16 about one orthogonal axis 19, while the adjustment of the seat 16 with respect to the frame 14 adjusts the seat 16 about the second orthogonal axis 21.

In certain embodiments, once adjustments have been made, a shim of aluminum may be positioned, even bonded, in a gap between the seat 16 and the frame 14, between the frame 14 and the base 12, or both. Accordingly, a better thermal continuity (still not as good as the continuous metal continuity throughout the mount 10) is available. However, the shim may have sufficient area that a substantial amount of heat may be transferred therethrough. Thus effectively the shims rigidize a flexure and can create three small areas or points of contact between two rigid elements.

Thus, the adjustment of the optical element 40 by adjustment of the seat 16 accomplishes isolation of adjustment about each of the axes 19, 21 independently. These axes 19, 21 being orthogonal, coplanar, and optically aligned with a feature of the optical element 40 provide a very simple, separately adjustable set of pivot axes 19, 21 for rapid adjustment of the alignment of the optical element 40. One can readily see that due to the lack of the conventional, connected, adjustment mechanisms, slides, pivots, and so forth, the seat 16 is more readily adjustable, independently adjustable in each direction about the respective axes 19, 21 without long, iterative processes for aligning several pieces of componentry in an iterative series in order to obtain alignment.

Figure 1:
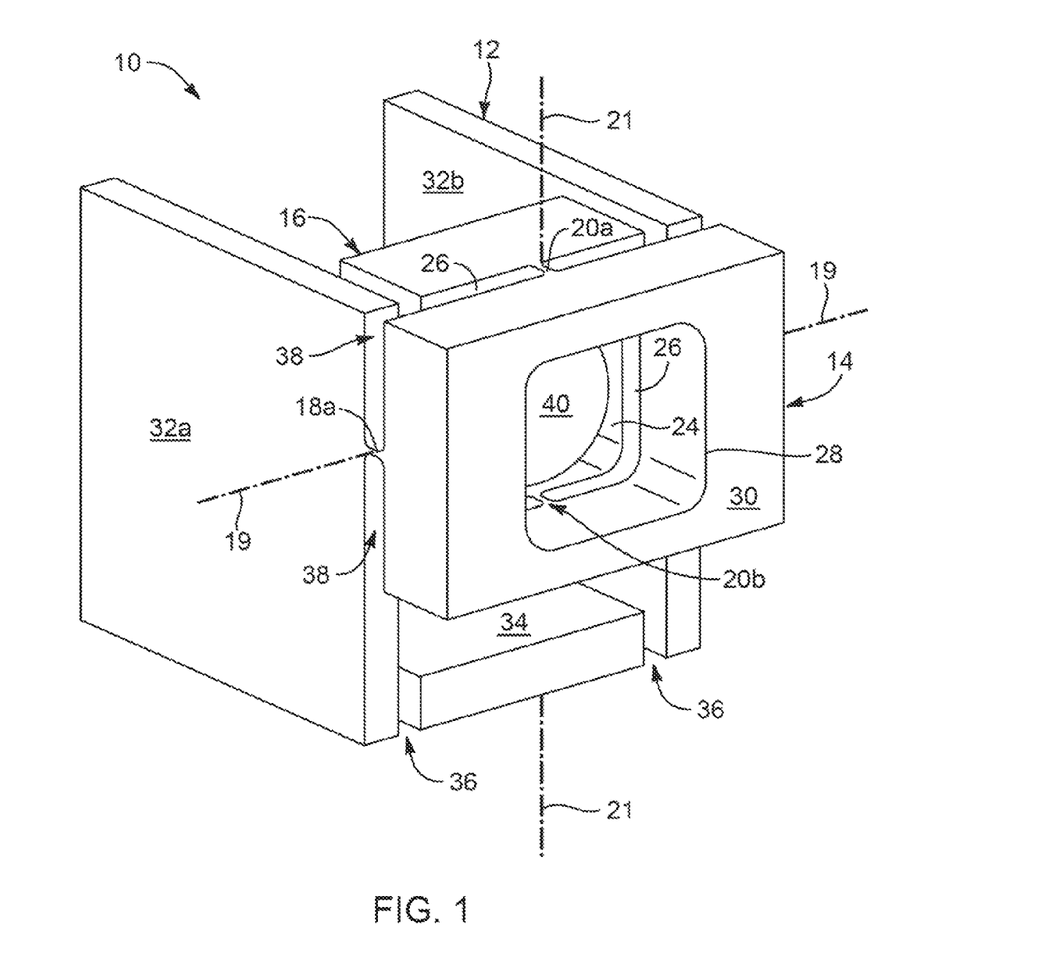
FIG. 1 is a frontal perspective view of one embodiment of a two-axis, optic mount having preferentially two orthogonal axes of adjustment for a mounted optical element thereon, in accordance with the invention.
Figure 2:
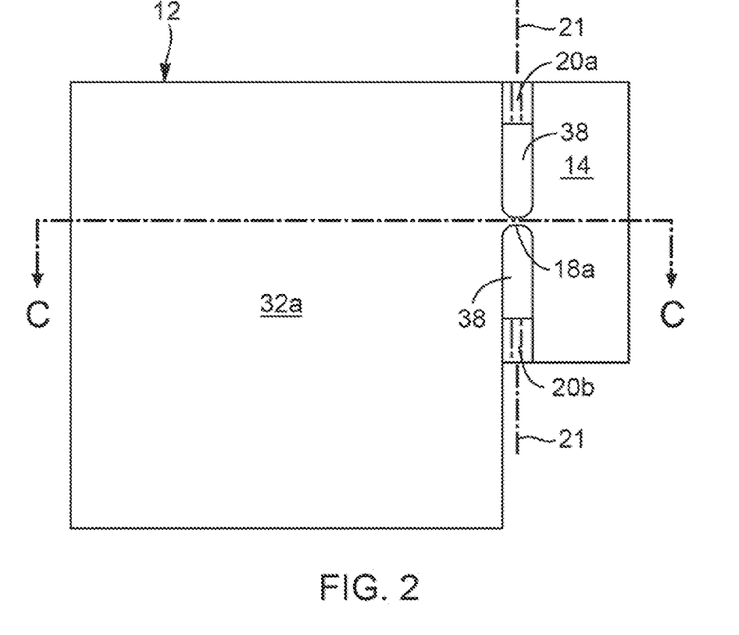
FIG. 2 is a left side elevation view of the apparatus of FIG. 1.
Figure 3:
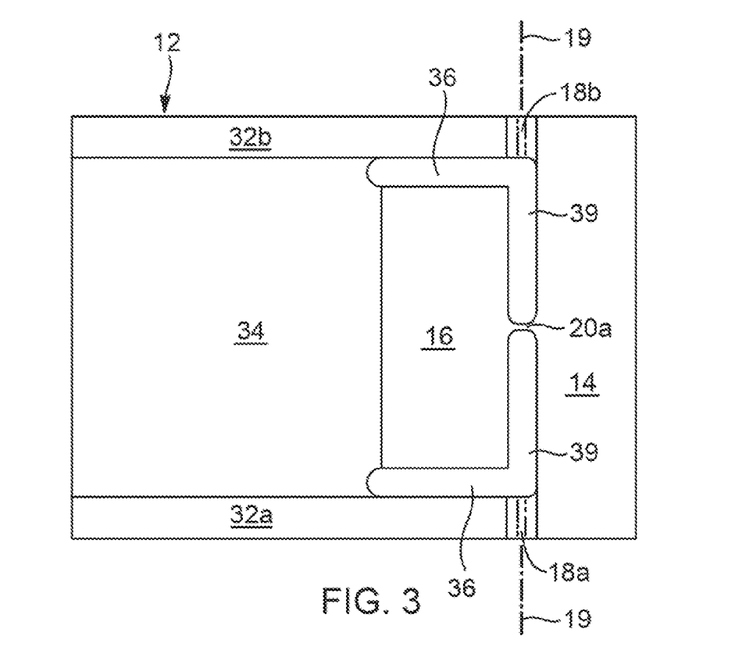
FIG. 3 is a top plan view thereof.
Figure 4:
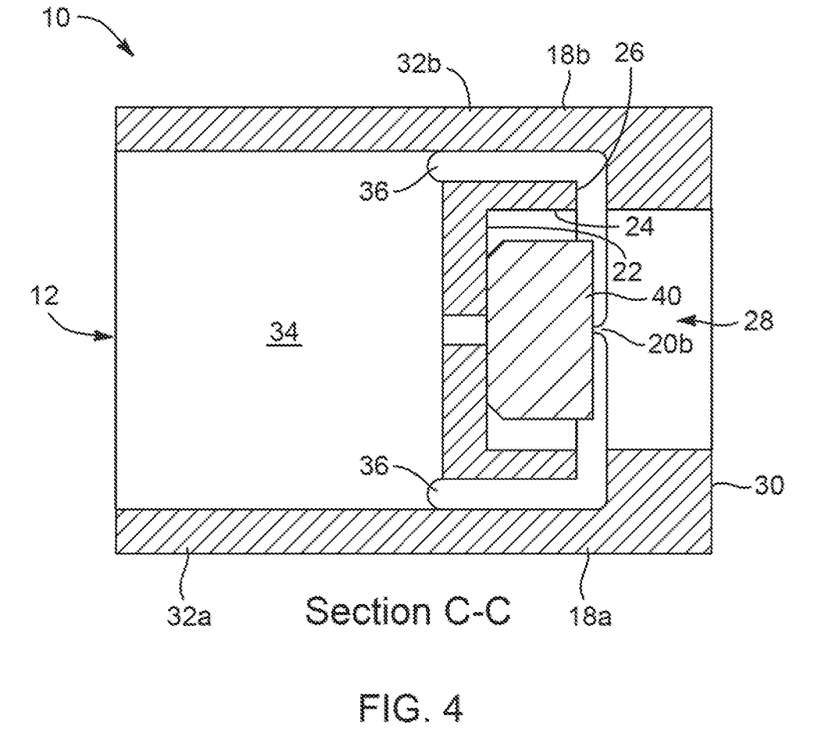
FIG. 4 is a top plan view of the section C-C illustrated in FIG. 2.
Figure 5:
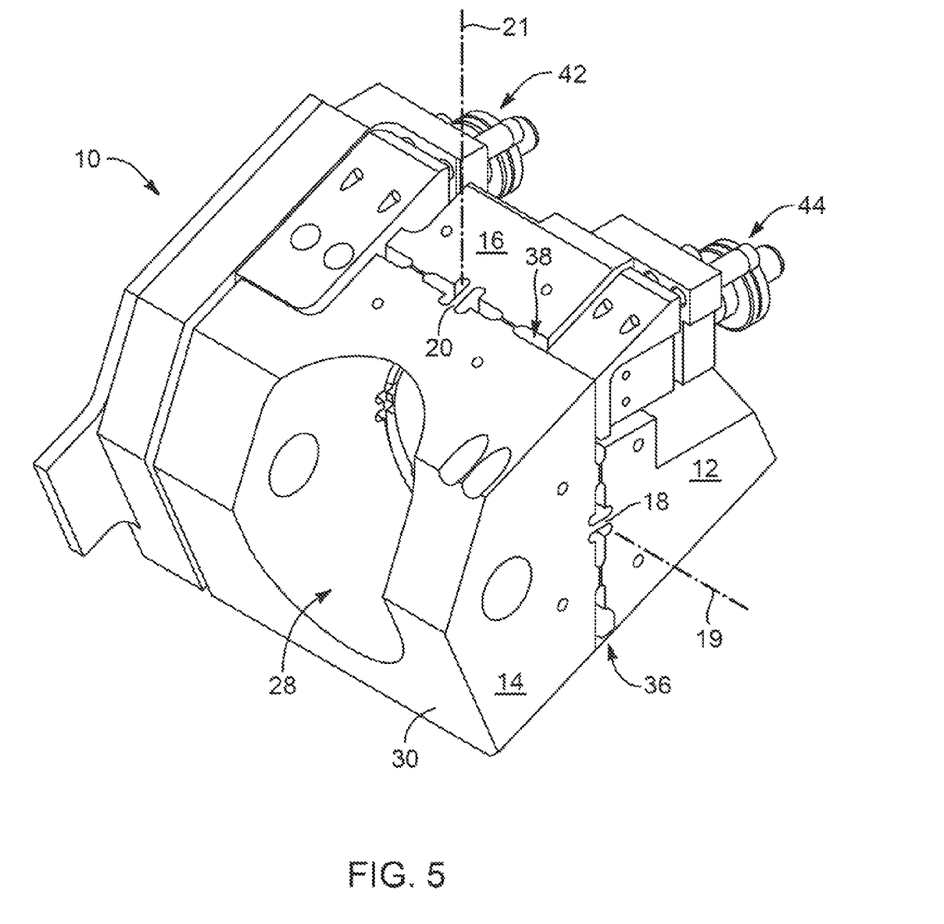
FIG. 5 is a frontal perspective view of an alternative embodiment of a two-axis, optical mount in accordance with the invention.

Referring to FIGS. 1-14 generally, and specifically to FIGS. 1 and 6, one may see that the mount 10 and its alignment processes provide a number of features and benefits. Optical alignments may be accomplished using the kinematic optic mount 10 with real-time feedback in the alignment process. For example, the optic 40 or optic element 40 and mount 10 may remain assembled during the entire alignment process.

This contrasts with conventional systems relying on multiple pieces or shims that must be iteratively assembled and then measured either optically or mechanically. Such systems must be aligned, measured, disassembled, reassembled and then have the process repeated until the desired alignment accuracy is achieved.

Disassembly of joints or removal of the optic 10 in a conventional system, to adjust shims, results in loss of alignment in the direction of any degree of freedom available. Removal of a bolt of screw type fastener will often introduce at least small movements in three degrees of freedom. Thus, movement typically occurs in directions other than that dimension being actively aligned.

Optical alignment of the seat 16 may instead use flexural adjustments about the axes 19, 21 perpendicular to each other. One adjustment does not affect the alignment in the non-adjustment direction in time or space. Each can be done at a different time. Each can be effected independently.

Alignment using flexures instead of sliding surfaces avoids having contact surfaces tending to gall, or develop burrs in response to the combination of contact forces and sliding forces. These phenomena and others make adjustments and measurements non-repeatable. Optical alignment using the kinematic optic mount 10 can be adjusted in any available dimension, backed off, and re-adjusted many times in a repeatable and controllable fashion. Moreover, all may be accomplished independently from one another and in quick succession.

Optical alignment using the kinematic optic mount 10, in accordance with the invention, is accomplished in a manner that results in a dimensionally stable and thermally stable optical system. This is due in part to the fact that there are no joints between adjustment axes 19, 21. This tends to eliminate stress buildup that would otherwise occur in joints if they were present during adjustment.

For example, joints in optical systems give an opportunity for stresses to build up during adjustment or temperature excursions that then later relax and cause the optical system to become misaligned. One specific example would be a joint that couples one component that cools slowly to a separate component that cools rapidly. Cooling these components can cause the joint to slip during cool down, which then stresses the mount 10 or the optic 40 to which the mount is attached.

The kinematic optical mount 10 allows the alignment to proceed in an optimal fashion since the pivot point (intersection of axes 19, 21) may be placed relative to the optic 40 in an optically desirable location. The optic 40 may be pivoted about a center point on the face of the optic, for example, to reduce beam walk during alignment adjustment. This saves a considerable amount of time otherwise required to reposition the mount in order to center the optical beam on the optic 40. Other preferred rotation points that may be placed at the intersection may be the vertex of the optical surface, center of curvature, focal point, and nodal points.

All of the foregoing benefits may be available, and the processes accomplished simultaneously using the kinematic optical mount 10 in accordance with the invention. The present invention may be embodied in other specific forms without departing from its basic function or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus, comprising:
  a first rigid element having a first rigid element section modulus;
  a first flexural element extending from the first rigid element to a second rigid element;
  the second rigid element having a second rigid element section modulus comparable with that of the first rigid element section modulus, both the first and second rigid element section moduli being orders of magnitude greater than a first flexural element section modulus;
  a second flexural element having a second flexural element section modulus comparable to that of the first flexural element section modulus, and orders of magnitude lower than the first and second rigid element section moduli;
  a third rigid element having a third rigid element section modulus comparable to that of the first and second rigid element section moduli, and orders of magnitude greater than the first and second flexural element section moduli; and
  the first, second, and third rigid elements and the first and second flexural elements, further being homogeneously formed of a single material, resulting in a monolithic mount having joint-free continuity of the single material from the first rigid element, through the second rigid element, to the third rigid element.

2. The apparatus of claim 1, wherein:
  the first and third rigid elements are connected by central web regions therebetween such that the third rigid element is adjustable with respect to the first rigid element along adjustment axes that are mutually orthogonal and coplanar, the adjustment axes extending through the central web regions, each central web region being a respective region of minimum section modulus in each of the first and second flexural elements.

3. The apparatus of claim 2 further comprising:
  first and second adjustments, connected, respectively, to the first rigid element to apply a force against the second rigid element, and on the third rigid element to apply a force against the second rigid element; and
  the first and second adjustments being operably independent, and positioned to adjust the respective second and third rigid elements about the adjustment axes, independently from one another.

4. The apparatus of claim 1, further comprising:
  the first, second, and third rigid elements, and the first and second flexural elements forming a dimensionally stable, thermally stable, mechanical path extending continuously from the first rigid element, through the first flexural element, through the second rigid element, through the second flexural element, and into the third rigid element uninterrupted by other than changes in cross section.

5. The apparatus of claim 1, further comprising:
an optical element fixed to the third rigid element and having a feature represented by a point;
wherein the point is positioned with respect to the first and second flexural elements and with respect to the third rigid element within a plane of the first and second flexural elements.

6. The mount of claim 5, wherein the point is selected from a vertex, a center of curvature, a focal point, and a nodal point corresponding to the optical element.

7. The apparatus of claim 1, wherein:
the first flexural element defines a first axis of flexure;
the second flexural element defines a second axis of flexure;
the first and second axes of flexure are co-planar and orthogonal, defining an intersection thereof;
a position of the second rigid element with respect to the first rigid element is adjustable about the first axis of flexure; and
a position of the third rigid element with respect to the second rigid element is adjustable about the second axis of flexure.

8. The apparatus of claim 7, further comprising:
the first, second, and third rigid elements, and the first and second flexural elements forming a dimensionally stable, thermally stable, mechanical path extending continuously from the first rigid element, through the first flexural element, through the second rigid element, through the second flexural element, and into the third rigid element uninterrupted by other than changes in cross section.

9. The apparatus of claim 8, further comprising:
an optical element fixed to the third rigid element and having a feature represented by a point;
wherein the point is positioned with respect to the first and second flexural elements and with respect to the third rigid element within a plane of the first and second flexural elements.

10. The apparatus of claim 9, wherein the point is selected from a vertex, a center of curvature, a focal point, and a nodal point corresponding to the optical element.

11. A method of adjusting an optical element, the method comprising:
providing a two-axis mount having first, second, and third rigid elements, connected respectively by first and second flexural elements;
mounting an optical element to the third rigid element;
adjusting the third rigid element with respect to the second rigid element, independently from adjustment of the second rigid element with respect to the first rigid element;
adjusting the second rigid element with respect to the first rigid element, independently from adjustment of the third rigid element with respect to the second rigid element;
the adjusting of the third and second rigid elements with respect to the second and first rigid elements respectively further comprising adjusting the third rigid element with respect to the second rigid element and the second rigid element with respect to the first rigid element by pivoting along respective axes defined by the first and second flexural elements, the axes being mutually orthogonal to one another.

12. The method of claim 11, wherein the axes are co-planar.

13. The method of claim 12, wherein the first, second, and third rigid elements are sections of a single, solid, continuous monolith.

14. The method of claim 13, wherein the first, second, and third rigid elements are formed of a single, homogenous material, continuously extending therethroughout and therebetween.

15. The method of claim 14, wherein the axes are each further defined by a respective region of minimum cross section in the single, homogenous material, each said respective region extending continuously and homogeneously between the first and second rigid elements and the second and third rigid elements, respectively.

16. The method of claim 11, further comprising:
providing the first rigid element having a comparatively large section modulus;
providing the first flexural element extending from the first rigid element to the second rigid element through a region of comparatively small section modulus;
providing the second rigid element having a section modulus comparable with that of the first rigid element, and orders of magnitude greater than the section modulus of the first flexural element;
providing the second flexural element having a section modulus comparable to that of the section modulus of the first flexural element, and orders of magnitude below the section modulus of the first and second rigid elements; and
providing the third rigid element having a section modulus comparable to that of the first and second rigid elements, and orders of magnitude greater than the section modulus of the first and second flexural elements.

17. The method of claim 11, wherein:
the third rigid element is adjustable with respect to the first rigid element along the respective axes;
the respective axes extend through and define a central web region of minimum section modulus in each of the first and second flexural elements extending respectively between the first and second rigid elements and between the second and third rigid elements.

18. The method of claim 17, further comprising:
providing first and second adjustments connected, respectively, to the first rigid element to act against the second rigid element, and to the third rigid element to act against the second rigid element, the first and second adjustments being operably independent, and positioned to adjust the respective second and third rigid elements about the mutually orthogonal axes, independently from one another.

19. The method of claim 18, further comprising forming the first, second, and third rigid elements with the first and second flexural elements in a dimensionally stable and thermally stable mechanical path extending continuously from the first rigid element, through the first flexural element, through the second rigid element, through the second flexural element, and into the third rigid element, uninterrupted by other than changes in cross section.

20. The method of claim 18 further comprising:
adjusting the first and second adjustments;
forming at least one shim sized to fit between at least one pair of the first and second rigid elements and the second and third rigid elements; and
securing the at least one shim in a position to fix at least one combination of the second rigid element with respect to the first rigid element and the third rigid element with respect to the second rigid element.

* * * * *